US012362480B2

(12) United States Patent
Sone et al.

(10) Patent No.: US 12,362,480 B2
(45) Date of Patent: Jul. 15, 2025

(54) COMPOSITE ANTENNA DEVICE

(71) Applicant: YOKOWO CO., LTD., Tokyo (JP)

(72) Inventors: Takayuki Sone, Tomioka (JP); Bunpei Hara, Tomioka (JP)

(73) Assignee: YOKOWO CO., LTD., Tokyo (JP)

(*) Notice: Subject to any disclaimer, the term of this patent is extended or adjusted under 35 U.S.C. 154(b) by 567 days.

(21) Appl. No.: 17/622,249

(22) PCT Filed: Jun. 24, 2020

(86) PCT No.: PCT/JP2020/024759

§ 371 (c)(1),
(2) Date: Dec. 23, 2021

(87) PCT Pub. No.: WO2020/262444

PCT Pub. Date: Dec. 30, 2020

(65) Prior Publication Data

US 2022/0352629 A1 Nov. 3, 2022

(30) Foreign Application Priority Data

Jun. 26, 2019 (JP) ................................ 2019-118754

(51) Int. Cl.
*H01Q 5/307* (2015.01)
*H01Q 1/24* (2006.01)
*H01Q 9/04* (2006.01)

(52) U.S. Cl.
CPC ............ *H01Q 5/307* (2015.01); *H01Q 1/241* (2013.01); *H01Q 9/0407* (2013.01)

(58) Field of Classification Search
CPC ...... H01Q 1/243; H01Q 1/32; H01Q 5/30–35; H01Q 5/378–392; H01Q 9/0407
See application file for complete search history.

(56) References Cited

U.S. PATENT DOCUMENTS

| | | | | |
|---|---|---|---|---|
| 10,931,016 | B2 * | 2/2021 | Yun | H01Q 1/521 |
| 11,276,926 | B2 * | 3/2022 | Yun | H01Q 1/243 |
| 2002/0140612 | A1 | 10/2002 | Kadambi et al. | |
| 2006/0017646 | A1 | 1/2006 | Koide | |
| 2011/0140975 | A1 | 6/2011 | Shigetomi | |

(Continued)

FOREIGN PATENT DOCUMENTS

| | | | |
|---|---|---|---|
| JP | 2009-124577 | A | 6/2009 |
| JP | 2009-207076 | A | 9/2009 |

(Continued)

OTHER PUBLICATIONS

Extended European Search Report issued Jun. 19, 2023, in corresponding European Patent Application No. 20832565.4, 19pp.

(Continued)

*Primary Examiner* — Hasan Islam
(74) *Attorney, Agent, or Firm* — XSENSUS LLP

(57) ABSTRACT

A composite antenna device includes a first antenna, plural second antennas whose used frequency bands are different from a used frequency band of the first antenna, and a first conductor portion to serve as a ground plane of the first antenna and the second antennas. Each of the plural second antennas may have a second conductor portion. The first antenna may be provided on the first conductor portion, and at least a portion of the first conductor portion may be positioned between the second conductor portions.

14 Claims, 10 Drawing Sheets

(56) References Cited

U.S. PATENT DOCUMENTS

2015/0071137 A1* 3/2015 Thiam .................... H01Q 1/521
343/702
2019/0190136 A1 6/2019 Sone
2021/0098866 A1* 4/2021 Kim ......................... H01Q 9/32

FOREIGN PATENT DOCUMENTS

JP 2011-130115 A 6/2011
JP 2015-185908 A 10/2015
JP 2018-50207 A 3/2018
WO 2018110671 A1 6/2018

OTHER PUBLICATIONS

International Search Report and Written Opinion mailed on Sep. 8, 2020, received for PCT Application PCT/JP2020/024759, Filed on Jun. 24, 2020, 10 pages including English Translation.
Notice of Reasons for Refusal mailed Oct. 1, 2024, in Japanese Application No. 2021-527681, 8 pages. (with English Translation).

* cited by examiner (A)

(B)

(C)

(D)

(E)

(F)

COMPOSITE ANTENNA DEVICE

CROSS-REFERENCE TO RELATED APPLICATIONS

The present application is based on PCT filing PCT/JP2020/024759, filed Jun. 24, 2020, which claims priority to JP 2019-118754, filed Jun. 26, 2019, the entire contents of each are incorporated herein by reference.

TECHNICAL FIELD

The present invention relates to a composite antenna device to be arranged in a spatially limited part of a vehicle such as an instrument panel of a vehicle.

BACKGROUND ART

As a related art example of this kind, a composite antenna device in which plural antennas sharing a ground plane are united is disclosed in Patent Literature 1. In a case where plural antennas share a ground plane (an electric conductor functioning as a ground for antennas, the same applies to the following), interference between antennas becomes a problem. In the composite antenna device disclosed in Patent Literature 1, one antenna is arranged to be offset in a center direction of a vehicle cabin with respect to the center of a ground plane as a reference and by ¼ or more of the length of the ground plane in a front-rear direction, and the other antenna is arranged to be offset on the opposite side to the one antenna with respect to the center of the ground plane as a reference and by ¼ or more of the length of the ground plane in the front-rear direction.

PRIOR ART DOCUMENTS

Patent Literature

Patent Literature 1: Japanese Patent Laid-Open No. 2009-124577

SUMMARY OF INVENTION

Problems to be Solved by the Invention

In a composite antenna device disclosed in Patent Literature 1, feeding points of plural antennas are at almost the same heights with respect to the earth, and extending directions of main coverages of electric waves are the same. In such an arrangement structure, when frequencies of used electric waves are adjacent, the coverages overlap, and interference between the antennas is likely to occur. Thus, the distance between the antennas cannot be decreased for preventing the interference. In other words, the area of a ground plane cannot be decreased. Thus, the size of the antennas including the ground plane has to be increased.

One object of the present invention is, in a composite antenna device, to enable an improvement in characteristics of each antenna while inhibiting an increase in size.

Solution to the Problems

A first aspect of the present invention provides a composite antenna device including: a first antenna; plural second antennas of which used frequency bands are different from a used frequency band of the first antenna; and a first conductor portion to serve as a ground plane of the first antenna and the second antennas, wherein each of the plural second antennas has a second conductor portion, wherein the first antenna is provided on the first conductor portion, and wherein at least a portion of the first conductor portion is positioned between the second conductor portions.

A second aspect of the present invention provides a composite antenna device including: a first antenna; a second antenna of which a used frequency band and an extending direction of a main coverage are different from a used frequency band and an extending direction of a main coverage of the first antenna; a first conductor portion to serve as a ground plane of the first antenna and the second antenna; and a second conductor portion to serve as the second antenna, wherein the first conductor portion has a flat surface portion on which the first antenna is placed and an inclined face portion which inclines at a predetermined angle on an opposite side to a side where the first antenna is placed with respect to the flat surface portion, wherein the second conductor portion is electrically continuous with the inclined face portion, and wherein the second conductor portion has an insulating substrate and an electric conductor formed on a surface of the substrate.

A third aspect of the present invention provides a composite antenna device including: a first antenna; a second antenna whose extending direction of a main coverage is different from an extending direction of a main coverage of the first antenna; a first conductor portion to serve as a ground plane of the first antenna and the second antenna; and a second conductor portion to serve as the second antenna, wherein the first conductor portion has a flat surface portion on which the first antenna is placed, wherein the second antenna is arranged on an opposite side to a side, with the flat surface portion in between, where the first antenna is placed, wherein the first antenna is a patch antenna, and wherein the second antenna is a cellular communication antenna.

Advantageous Effects of the Invention

A composite antenna device enables an improvement in characteristics of each antenna while inhibiting an increase in size.

DESCRIPTION OF EMBODIMENT

An example of an embodiment of a composite antenna device will hereinafter be described. A composite antenna device of the present embodiment is installed in a vehicle cabin of a vehicle, for example, an instrument panel or the like of a vehicle and is connected with electronic apparatuses on the vehicle side via plural coaxial cables. A structure example of the composite antenna device is illustrated by an exploded perspective view of FIG. 1. For convenience of description, in the following, X axis, Y axis, and Z axis will be defined which are three orthogonal axes with respect to an installation part of the composite antenna device. In these three orthogonal axes, a +Z direction as seen from the earth is set as up, a −Z direction as seen from the earth is set as down, a +X-axis direction is set as front, a −X-axis direction is set as rear, a +Y-axis direction is set as the left direction, and a −Y-axis direction is set as the right direction. Further, descriptions may be made while a plane including the X axis and the Y axis is set as a horizontal plane. In this case, a horizontal plane is a plane parallel with the earth.

Figure 1:
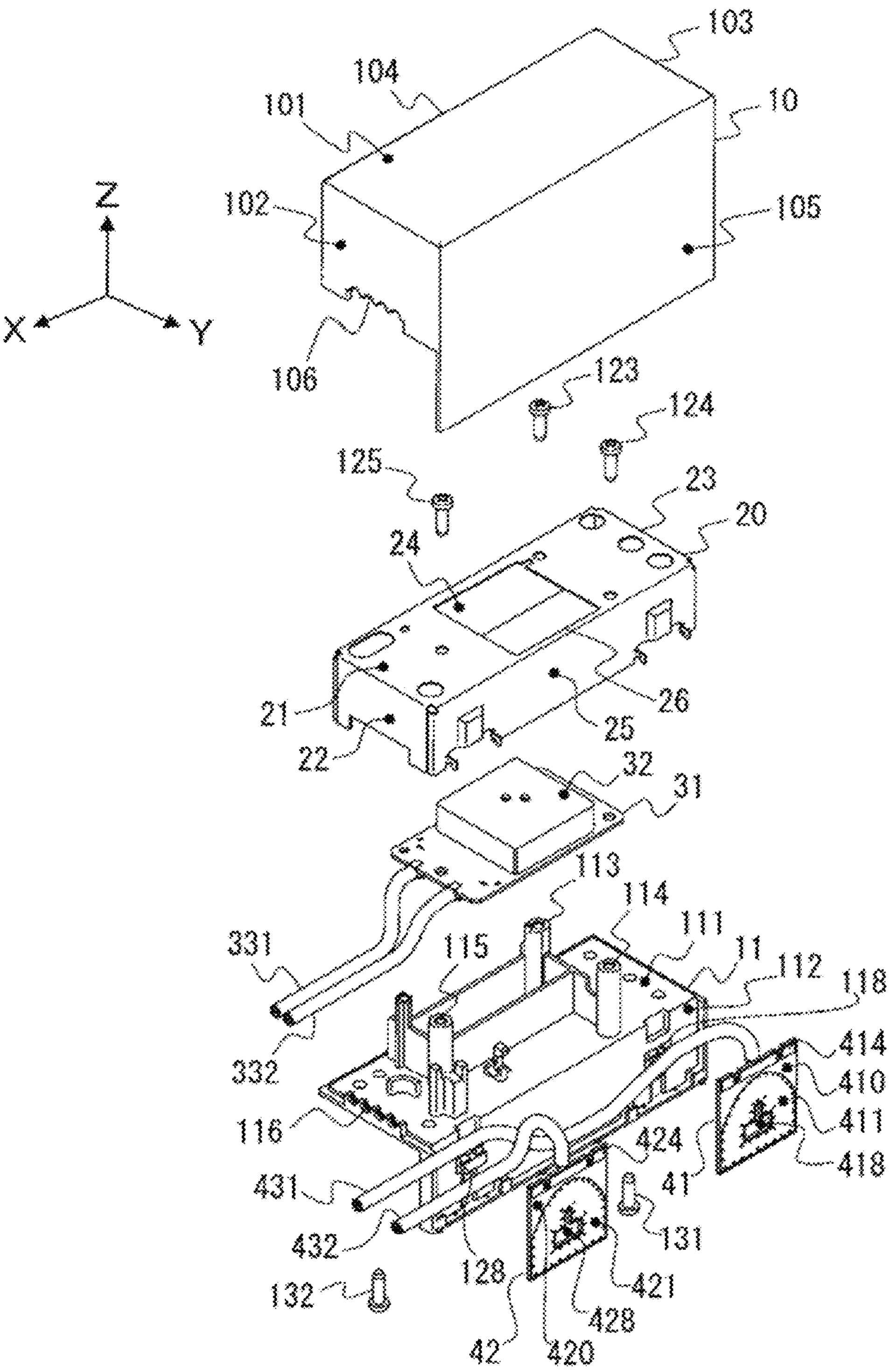
FIG. 1 is an exploded perspective view for explaining a structure example of a composite antenna device according to the present embodiment.

FIG. 1 is an exploded perspective view illustrating the structure example of the composite antenna device.

Referring to FIG. 1, the composite antenna device has a radome 10 and a base 11 each of which is transmissive for electric waves. The radome 10 has a flat surface portion 101 which is parallel with the horizontal plane and is in a quadrangular shape, a first side face portion 102 which inclines downward from a front short side of the flat surface portion 101, a second side face portion 103 which inclines downward from a rear short side of the flat surface portion 101, a third side face portion 104 which inclines downward from a right long side of the flat surface portion 101, and a fourth side face portion 105 which inclines downward from a left long side of the flat surface portion 101.

The first side face portion 102, the second side face portion 103, the third side face portion 104, and the fourth side face portion 105 are examples of inclined face portions which incline at predetermined angles (for example, downward at about 90 degrees) with respect to the flat surface portion 101 and extend in directions separating from the flat surface portion. Lower ends of the first side face portion 102, the second side face portion 103, and the third side face portion 104 are open while the fourth side face portion 105 is provided as one side. A lower length of the fourth side face portion 105 is longer than lower lengths of the first side face portion 102, the second side face portion 103, and the third side face portion 104. At the lower end of the first side face portion 102, a notch 106 for positioning and retaining coaxial cables 331, 332, 431, and 432 described later is formed.

The base 11 has a flat surface portion 111 which is parallel with the flat surface portion 101 of the radome 10 for sealing a lower opening portion of the radome 10 and has almost the same projected area (the projected area onto the earth) as the area of the opening portion of the radome 10. On this flat surface portion 111, retaining structures for retaining a three-dimensional ground plane 20, plural antennas, and an electronic circuit which will be described later, that is, three screw receiving portions 113, 114, and 115 each of which is reinforced by partition walls are formed. Further, on a front side of the flat surface portion 111, a protruding body 116 is formed which protrudes upward for retaining the coaxial cables 331, 332, 431, and 432 described later. A left side face portion 112 is formed which inclines downward at about 90 degrees from a left long side of the flat surface portion 111. The base 11 is fixed to an electronic circuit substrate 31 by screws 131 and 132 from a bottom surface side.

The composite antenna device includes the three-dimensional ground plane 20 as one example of a first conductor portion. The three-dimensional ground plane 20 is formed with an electrically conductive member retained by the base 11. The three-dimensional ground plane 20 has a flat surface portion 21 parallel with the horizontal plane, a first side face portion 22 which inclines downward from a front short side of the flat surface portion 21, a second side face portion 23 which inclines downward from a rear short side of the flat surface portion 21, a third side face portion 24 which inclines downward from a right long side of the flat surface portion 21, and a fourth side face portion 25 which inclines downward from a left long side of the flat surface portion 21. As for the height and width of the three-dimensional ground plane 20, when the wavelength of the minimum frequency used by planar elements 41 and 42 described later is set as $\lambda$ in this example, the height is at least approximately $\lambda/6$, and the width is at least approximately $(2/5)\lambda$.

The three-dimensional ground plane 20 has to be housed in an internal housing space of the radome 10. Thus, short-side sizes (lengths in the Y-axis direction) of the first side face portion 22 and the second side face portion 23 are somewhat shorter than short-side sizes of the radome 10 and the base 11. Further, long-side sizes (lengths in the X-axis direction) of the third side face portion 24 and the fourth side face portion 25 are somewhat shorter than long-side sizes of the radome 10 and the base 11. A portion of a lower end of the first side face portion 22 is notched slightly larger than the notch 106 of the radome 10 and the protruding body 116 of the base 111.

In an almost central portion of the flat surface portion 21, an opening window portion 26 in a generally quadrangular shape is formed. As for the shape and size, this opening window portion 26 has the same external shape as a patch antenna 32, which is in a generally quadrangular prism shape as one example of a first antenna, and the opening window portion 26 has a size slightly larger than the patch antenna 32.

The patch antenna 32 is a planar antenna (unit) for circularly polarized waves, which is arranged in parallel or generally parallel with the earth, and an extending direction of a main coverage is an upward direction (Z-axis direction). In this example, a general-purpose planar antenna for a global navigation satellite system (hereinafter, "GNSS") is used as the patch antenna 32. The patch antenna 32 is used in either one of frequency bands of the GPS (Global Positioning System: a frequency band of 1575.397 to 1576.443 MHz) and the GNSS (a frequency band of 1597.807 to 1605.6305 MHz). Operating frequencies of the patch antenna 32 can appropriately be changed.

The patch antenna 32 is fixed to the electronic circuit substrate 31 with which two coaxial cables 331 and 332 are connected and is positioned such that the portion except the electronic circuit substrate 31 is exposed from the opening window portion 26 of the flat surface portion 21 of the three-dimensional ground plane 20. On the electronic circuit substrate 31, the electronic circuit including a feeding point for the patch antenna 32 and a ground pattern are formed. Since the two coaxial cables 331 and 332 are only for distribution, only one of the coaxial cables may be used.

As for the heights (thicknesses), the electronic circuit substrate 31 and the flat surface portion 21 of the three-dimensional ground plane 20 are thin compared to the patch antenna 32. Thus, when the electronic circuit substrate 31 is, together with the three-dimensional ground plane 20, fixed to the screw receiving portions 113, 114, and 115 of the base 11 by screws 123, 124, and 125, almost all portions of the patch antenna 32 in the height direction are exposed from the opening window portion 26. Further, the feeding point of the patch antenna 32 comes to almost the same height as the flat surface portion 21 of the three-dimensional ground plane 20. In addition, when the electronic circuit substrate 31 is fixed by screw fastening, its ground pattern becomes electrically continuous with the three-dimensional ground plane 20. Thus, the three-dimensional ground plane 20 acts as a ground plane (ground) of the patch antenna 32.

Figure 2:
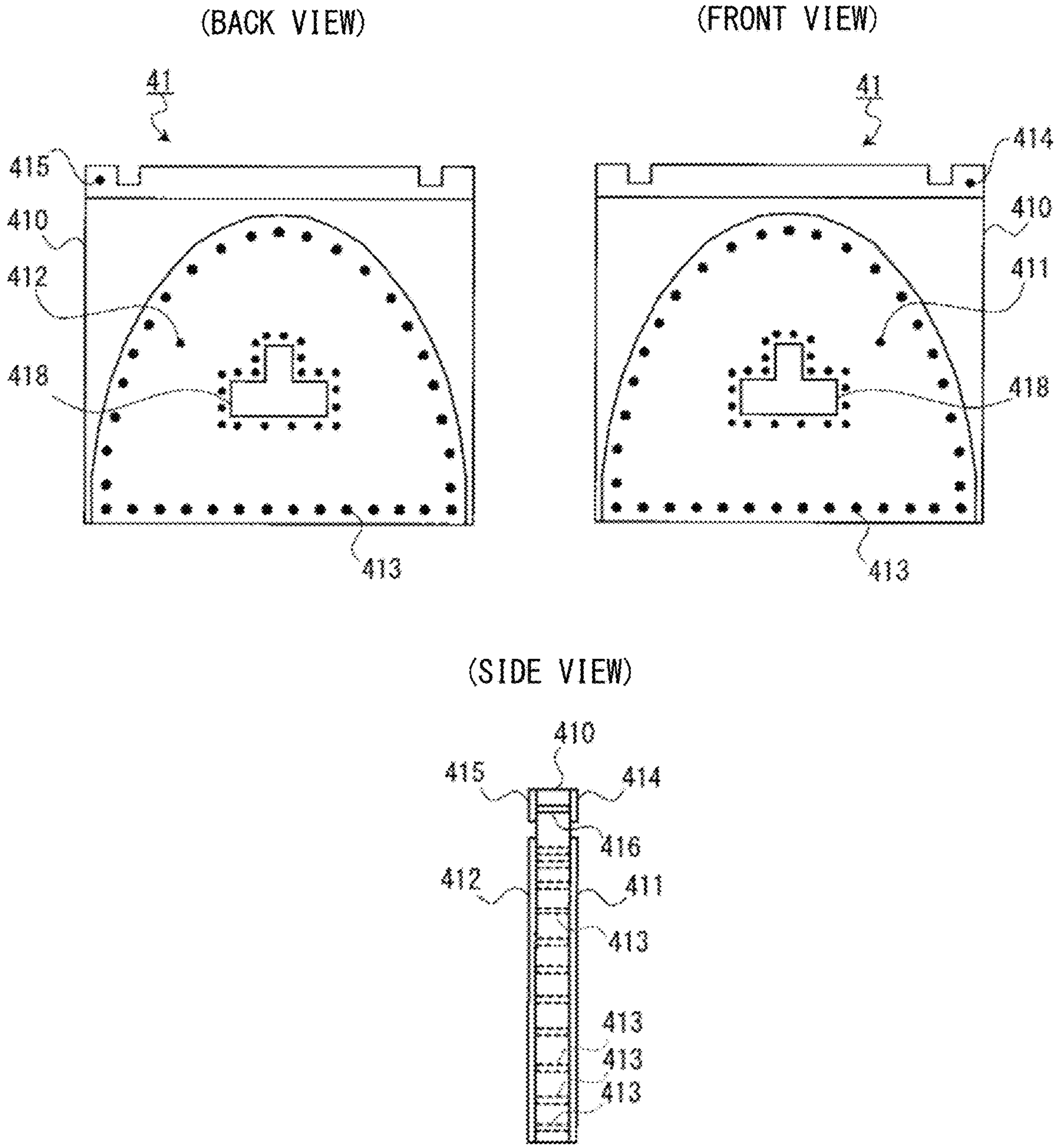
FIG. 2 illustrates diagrams in a front view, a back view, and a side view for explaining a structure of a planar element provided to the composite antenna device.

On the left side face portion 112 of the base 11, a pair of planar elements 41 and 42 as examples of second conductor portions are, respectively with the coaxial cables 431 and 432, arranged in parallel with the left side face portion 112 of the base 11. Referring to FIG. 2, structures of the planar elements 41 and 42 will be described. FIG. 2 illustrates diagrams of the structure of the planar element 41 in a front view, a back view, and a side view.

The planar element 41 has a pair of planar antenna patterns 411 and 412 and a pair of ground patterns 414 and 415, which are formed on both surfaces of a printed substrate 410, for example. The antenna patterns 411 and 412 have broadband characteristics. In this example, a contour of each of the antenna patterns 411 and 412 has a shape including a curve in at least a portion, a semi-elliptical shape is employed here, and the planar element 41 thereby has broadband characteristics. For example, each of the pair of antenna patterns 411 and 412 is arranged in substantially the same plane as the fourth side face portion 25 of the three-dimensional ground plane 20 and in a direction separating from the flat surface portion 21. The pair of antenna patterns 411 and 412 are electrically continuous with each other via electrically conductive viaholes 413. The pair of ground patterns 414 and 415 are also electrically continuous with each other via an electrically conductive viahole 416.

The ground patterns 414 and 415 are electrically continuous with each other by the viahole 416, the antenna patterns 411 and 412 are arranged to be opposed to the ground patterns 414 and 415, and further those ground patterns 414 and 415 are electrically connected with the three-dimensional ground plane 20. Accordingly, operation and effect generally similar to a biconical antenna are imitatively provided. Further, the ground patterns 414 and 415 and the three-dimensional ground plane 20 electrically connected therewith virtually provide operation and effect as if another antenna element was oppositely arranged. Consequently, it becomes possible to achieve a broadband.

Central portions of the pair of antenna patterns 411 and 412 are notched in an inverted T shape (or in a convex shape). This is an attachment hole 418 for attachment to the left side face portion 112 of the base 11. An engagement portion 118 is formed in the part corresponding to the attachment hole 418 in the left side face portion 112 of the base 11. This engagement portion 118 has a head portion and a foot portion which elastically supports this head portion. The head portion of the engagement portion 118 has such a length in the front-rear direction that the head portion passes through a hole of the attachment hole 418 in the front-rear direction. The foot portion has such a length in the front-rear direction that the foot portion passes through a hole of the attachment hole 418 in a vertical direction and has a length in a left-right direction which corresponds to the thickness of the planar element 41. Thus, only by causing the head portion of the engagement portion 118 to pass through the attachment hole 418 and thereafter displacing the engagement portion 118 upward, the planar element 41 can easily be engaged with the left side face portion 112 of the base 11 (in a case of detachment, the engagement portion 118 is displaced in the opposite direction).

A locking portion 119 described later is also formed in a lower portion of the engagement portion 118, and the planar element 41 engaged with the engagement portion 118 is thereby locked so as not to move.

A signal line (center-side conductor) of the coaxial cable 431 is electrically connected with a portion in the pair of antenna patterns 411 and 412, the portion being closest to the ground patterns 414 and 415. Further, a ground line (outside conductor) of the coaxial cable 431 is electrically connected with the pair of ground patterns 414 and 415. The pair of ground patterns 414 and 415 are also electrically continuous with the fourth side face portion 25 of the three-dimensional ground plane 20. Thus, the planar element 41 operates as an antenna (second antenna) which has the ground patterns 414 and 415 and the three-dimensional ground plane 20 as a ground-side element and has the pair of antenna patterns 411 and 412 as a signal-side element. In this example, it is assumed that an antenna configured with the planar element 41 and the three-dimensional ground plane 20 is caused to operate as a cellular communication antenna that enables transmission and reception in a frequency band of 1.7 GHz to 6.0 GHz which is a higher range than the frequency band of the patch antenna 32 but to which a low range of used frequencies is adjacent.

FIG. 2 illustrates the structure of the planar element 41, and the structure of the planar element 42 is the same as the planar element 41 illustrated in FIG. 2. That is, each of a pair of antenna patterns formed on both surfaces of a printed substrate 420 (a front surface has an antenna pattern 421, but a back surface will not be described, and those antenna patterns may hereinafter be denoted as "the pair of antenna patterns 421") is arranged in substantially the same plane as the fourth side face portion 25 of the three-dimensional ground plane 20 and in the direction separating from the flat surface portion 21. Furthermore, the antenna patterns are electrically continuous with each other via viaholes similar to the electrically conductive viaholes 413. Further, a signal line of the coaxial cable 432 is electrically connected with a portion in the pair of antenna patterns 421, the portion being closest to a pair of ground patterns (a front surface has a ground pattern 424, but a back surface will not be described, and those ground patterns may hereinafter be denoted as "the pair of ground patterns 424").

Further, a ground line of the coaxial cable 432 is electrically connected with the pair of ground patterns 424. The pair of ground patterns 424 are also electrically continuous with the fourth side face portion 25 of the three-dimensional ground plane 20. Thus, the planar element 42 operates as an antenna (for example, another second antenna) which has the pair of ground patterns 424 and the three-dimensional ground plane 20 as a ground-side element and has the pair of antenna patterns 421 as a signal-side element. In this example, it is assumed that an antenna configured with the planar element 42 and the three-dimensional ground plane 20 is caused to operate as a cellular communication antenna that enables transmission and reception in a frequency band of 1.7 GHz to 6.0 GHz which is a higher range than the frequency band of the patch antenna 32 but to which a low range of used frequencies is adjacent.

An attachment hole 428 is formed in the planar element 42, and the planar element 42 is attached to the base 11 via this attachment hole 428. An engagement portion 128 is formed in the part corresponding to the attachment hole 428 in the left side face portion 112 of the base 11. This engagement portion 128 has the same structure as the engagement portion 118, and on its lower portion, a locking portion 129 described later (for example, a portion having the same structure as the locking portion 119) is mounted.

The planar element 41 and the planar element 42 have the three-dimensional ground plane 20 as a shared ground-side element and are arranged generally perpendicularly to the earth. Thus, the projected areas onto the earth almost correspond to the sum of the thicknesses of the printed substrates 410 and 420 and the thicknesses of antenna patterns 411, 412, 421, and 422, and the planar elements 41 and 42 are unlikely to be influenced by the earth. Further, extending directions of main coverages of the planar elements 41 and 42 are directions almost parallel with the earth (generally horizontal planes).

Although a high range side of the patch antenna 32 is adjacent to a used frequency band on a low range side of each of the cellular communication antennas, the extending directions of the main coverages are different between the patch antenna 32 and the two cellular communication antennas, and interference is thus unlikely to occur. However, because the used frequency bands of the cellular communication antennas are adjacent to each other, in view of inhibition of mutual interference, the present embodiment is configured such that feeding points of the planar element 41 and the planar element 42 are isolated from each other by ¼ or more of the wavelength of an electric wave for cellular communication.

Figure 3:
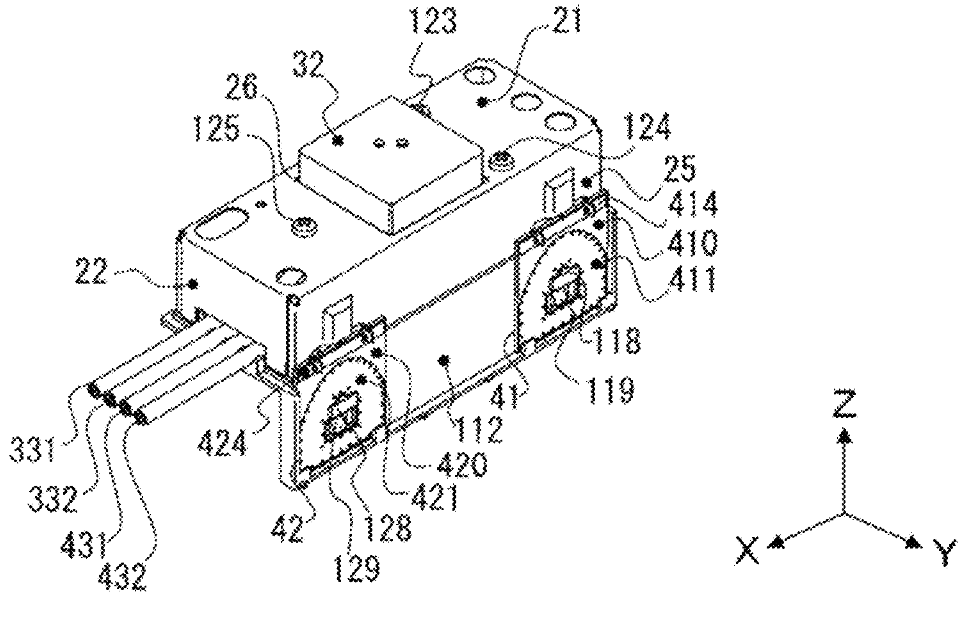
FIG. 3 is a perspective view illustrating an external appearance configuration example of the composite antenna device in a state where a radome is detached.
Figure 4:
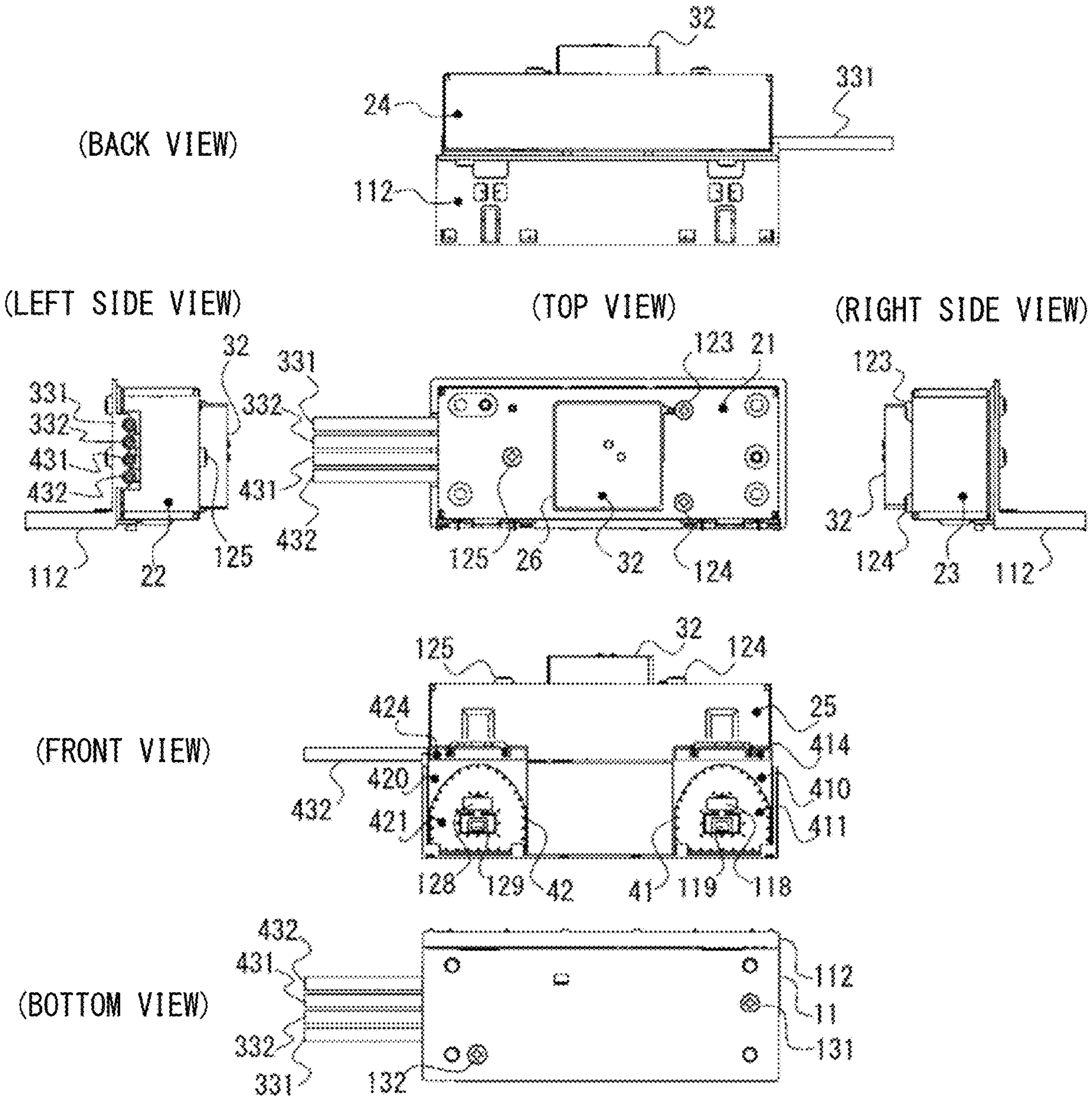
FIG. 4 illustrates six side views in a back view, a top view, a front view, a bottom view, a left side view, and a right side view for explaining the external appearance configuration example of the composite antenna device in a state where the radome is detached.

A configuration example of the composite antenna device in a state where the radome 10 is detached is illustrated in FIG. 3 and FIG. 4. FIG. 3 is a perspective view illustrating an external appearance configuration example of the composite antenna device in a state where the radome 10 is detached. FIG. 4 illustrates structure explaining diagrams of the external appearance configuration example of the composite antenna device in a state where the radome 10 is detached in a back view, a top view, a front view, a bottom view, a left side view, and a right side view. Those diagrams also illustrate the above locking portions 119 and 129. As it is clear from those diagrams, the composite antenna device includes the three-dimensional ground plane 20 and plural antennas which have characteristic shapes and structures. The three-dimensional ground plane 20 has the flat surface portion 21 which is parallel or generally parallel with the earth and the first side face portion 22, the second side face portion 23, the third side face portion 24, and the fourth side face portion 25 which are perpendicular or generally perpendicular to the earth, and those surface and face portions are integrally shaped with electrically conductive members. Thus, the three-dimensional ground plane 20 acts as the ground plane of the patch antenna 32 as the first antenna which protrudes from the flat surface portion 21. Further, in the planar elements 41 and 42 which are arranged in substantially the same plane as the fourth side face portion 25 of the three-dimensional ground plane 20, the ground patterns 414 and 415 of the planar element 41 and the pair of ground patterns 424 of the planar element 42 are electrically continuous with the three-dimensional ground plane 20. Thus, the three-dimensional ground plane 20 also acts as the ground-side element of the two cellular communication antennas as the second antennas having the planar elements 41 and 42 as the signal-side elements.

Compared to the projected area onto the earth of a plate-like ground plane having an equivalent surface area to the surface area of the three-dimensional ground plane 20, the projected area onto the earth of the three-dimensional ground plane 20 is small; however, the three-dimensional ground plane 20 functions as the ground plane of the patch antenna 32 of which the surface area is large compared to the projected area. Thus, operating characteristics of the patch antenna 32, for example, VSWR characteristics are considerably more stable than a patch antenna having a ground plane without the first side face portion 22 to the fourth side face portion 25. Further, an upward (Z-axis direction) gain of the patch antenna 32 can be improved more than a patch antenna having a ground plane without the first side face portion 22, the second side face portion 23, the third side face portion 24, and the fourth side face portion 25, that is, having a ground plane with the size of the flat surface portion 21. As a result, reception precision of the patch antenna 32 can further be enhanced.

Since the three-dimensional ground plane 20 also acts as the ground plane of each of the cellular communication antennas, only by securing a size of $\lambda/4$ or more with respect to a wavelength $\lambda$ of the minimum frequency of the used frequencies, inhibiting effects for a leakage current are provided throughout almost the whole range of the used frequencies. A coaxial cable may be used as a connection or feeding line between electronic circuits in a high frequency band. In this case, a potential difference between such an external conductor and the earth becomes an unignorable magnitude, and an unintended current may flow through the coaxial cable. Such a current becomes a leakage current and causes unintended radiation or loss.

Thus, in related art, in a case where cellular communication is performed in a high frequency band such as a 700 MHz band, it has been very necessary to apply a measure against a leakage current such as a ferrite core to the coaxial cable for feeding. However, a ferrite core is not only expensive but also large in weight and size. Moreover, with Snoek's limit taken into consideration, effects of a ferrite core cannot be expected at 1.7 GHz or higher in view of the state of the art.

In the composite antenna device of the present embodiment, the three-dimensional ground plane 20 which has an electrically larger area than a case of use at 700 MHz in related art becomes electrically continuous with external conductors of the coaxial cables 431 and 432. Thus, an occurrence of an unnecessary current propagated through the coaxial cables 431 and 432 is inhibited, and a measure against a leakage current does not have to be applied even in a high frequency band exceeding 1.7 GHz. As a result, a whole device configuration including the radome 10 and the base 11 can be made small and simple. Considering the point that restriction of a mounting region is a common problem in designing an antenna for a vehicle, a fact that an improvement in various characteristics of each antenna is enabled while the composite antenna device is made small and simple can provide very useful effects.

Figure 5:
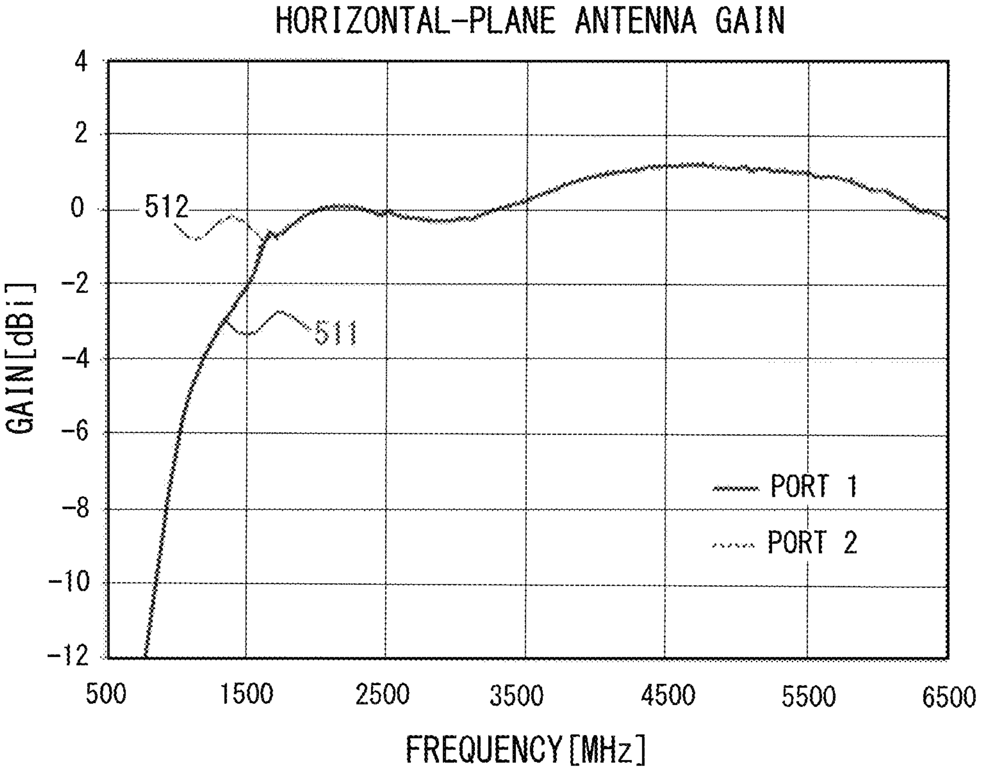
FIG. 5 is a horizontal-plane antenna gain characteristic diagram of cellular communication antennas of the composite antenna device.

A horizontal-plane antenna gain characteristic diagram of the cellular communication antennas of the present embodiment is illustrated in FIG. 5. In FIG. 5, the vertical axis represents a gain dBi, and the horizontal axis represents a frequency MHz. Further, "port 1" denotes the feeding point of the planar element 41, and "port 2" denotes the feeding point of the planar element 42. A solid line 511 represents a horizontal-plane antenna gain characteristic observed in the port 1, and a broken line 512 represents a horizontal-plane gain characteristic observed in the port 2. In other words, the gain of the port 1 is an antenna gain in a generally horizontal direction with respect to the earth, as seen from the feeding point of the planar element 41. The gain of the port 2 is an antenna gain in a generally horizontal direction with respect to the earth, as seen from the feeding point of the planar element 42. As illustrated in FIG. 5, in the cellular communication antennas of the present embodiment, the gains in the vicinities of the feeding points of the two planar elements 41 and 42 stably stand at around 0 dBi or higher throughout the whole range of a band of 1.7 GHz to 6 GHz.

Further, while the extending direction of the main coverage of the patch antenna 32 is an upward direction, the extending direction of the main coverage of each of the cellular communication antennas is a direction generally parallel with the earth. Thus, even when the used frequency bands are adjacent, mutual interference between the antennas is inhibited.

Further, because the planar elements 41 and 42 which act as the respective signal-side elements of the cellular communication antennas are arranged below the fourth side face portion 25 of the three-dimensional ground plane 20, a structure is provided in which the patch antenna 32 and the signal-side elements of the cellular communication antennas are arranged on opposite sides with respect to the ground (in this example, the three-dimensional ground plane 20). As a result, for example, even in a limited space in a vehicle cabin, while the VSWR characteristics and upward gain of the patch antenna 32 are maintained, sufficient electromagnetic intervals between the patch antenna 32 and the cellular communication antennas can be secured. In other words, isolation at a sufficient level between the antennas can be maintained.

Further, because the position of the feeding point of each of the cellular communication antennas is below the feeding point of the patch antenna 32 and the feeding points of those are separated in the height direction, isolation between the feeding points can also be improved. That is, the feeding point of each of the cellular communication antennas is positioned on an opposite side to the side where the patch antenna 32 is mounted with respect to the ground, and the feeding points of those are positioned in directions separating from each other. Thus, isolation between the feeding points can also be improved. Further, when seen from a horizontal direction (Y-axis direction), the patch antenna 32 is positioned between the two cellular communication antennas (the planar elements 41 and 42). As described above, because the feeding point of the patch antenna 32 is also separated, in the horizontal direction, from the feeding points of the cellular communication antennas, isolation between the antennas can be further improved.

MODIFICATION EXAMPLE 1

A configuration of the composite antenna device of the present invention is not limited to the example described in the present embodiment but may be carried out by variously modifying a portion thereof without departing from the scope of the gist of the invention. In the following, several modification examples will be described. For convenience, the same reference numerals will be given to the same configuration members or equivalent functional components as the composite antenna device of the present embodiment. Further, a representative configuration example of the composite antenna device of the present embodiment will schematically be illustrated.

Figure 6:
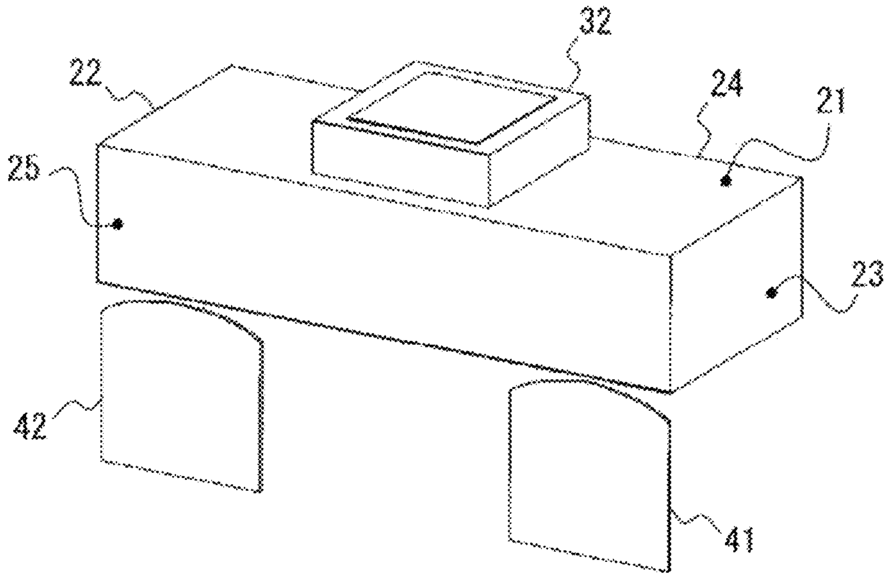
FIG. 6 is a schematic diagram of the composite antenna device of the present embodiment.
Figure 7:
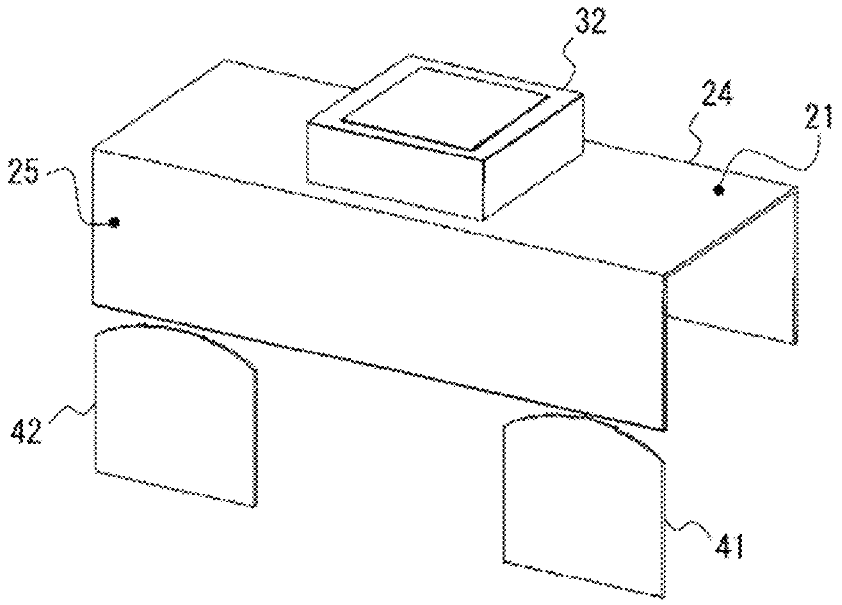
FIG. 7 is a schematic diagram of a composite antenna device according to a modification example 1.

FIG. 6 is a schematic diagram of the composite antenna device of the present embodiment. In this composite antenna device, the three-dimensional ground plane 20 has the first side face portion 22, the second side face portion 23, the third side face portion 24, and the fourth side face portion 25 which extend downward from the flat surface portion 21. FIG. 7 is a schematic diagram of a composite antenna device according to a modification example 1. As illustrated in FIG. 7, the composite antenna device according to the modification example 1 has a configuration in which the first side face portion 22 and the second side face portion 23 of the composite antenna device of the present embodiment are removed.

Figure 8:
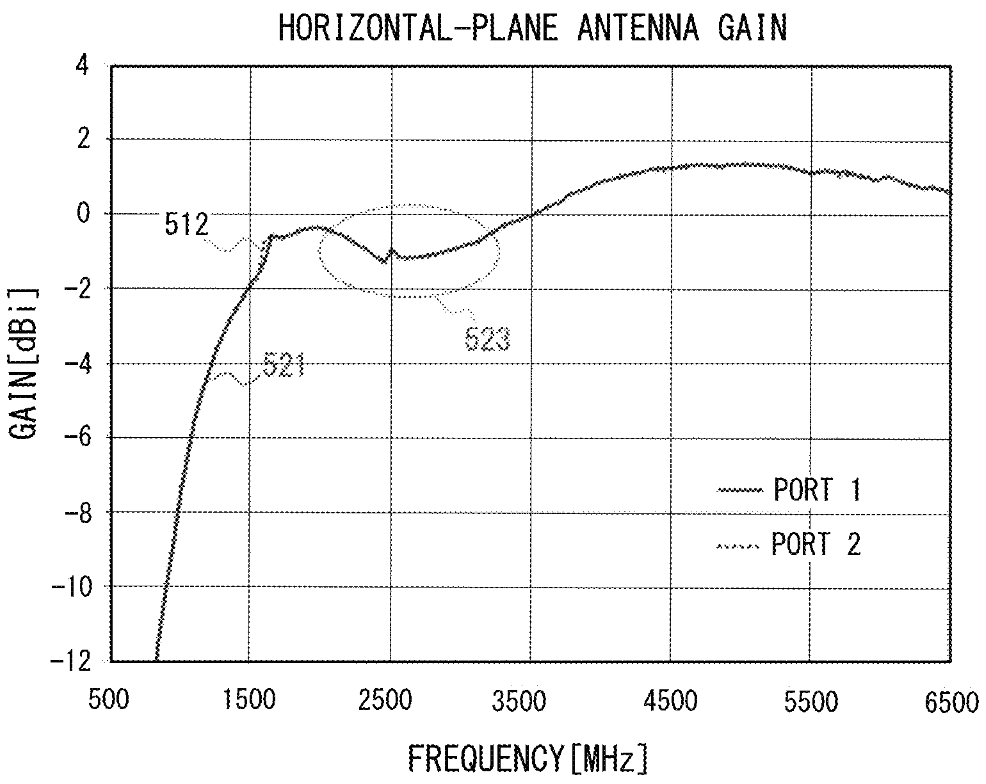
FIG. 8 is a horizontal-plane antenna gain characteristic diagram of the composite antenna device according to the modification example 1.
Figure 9:
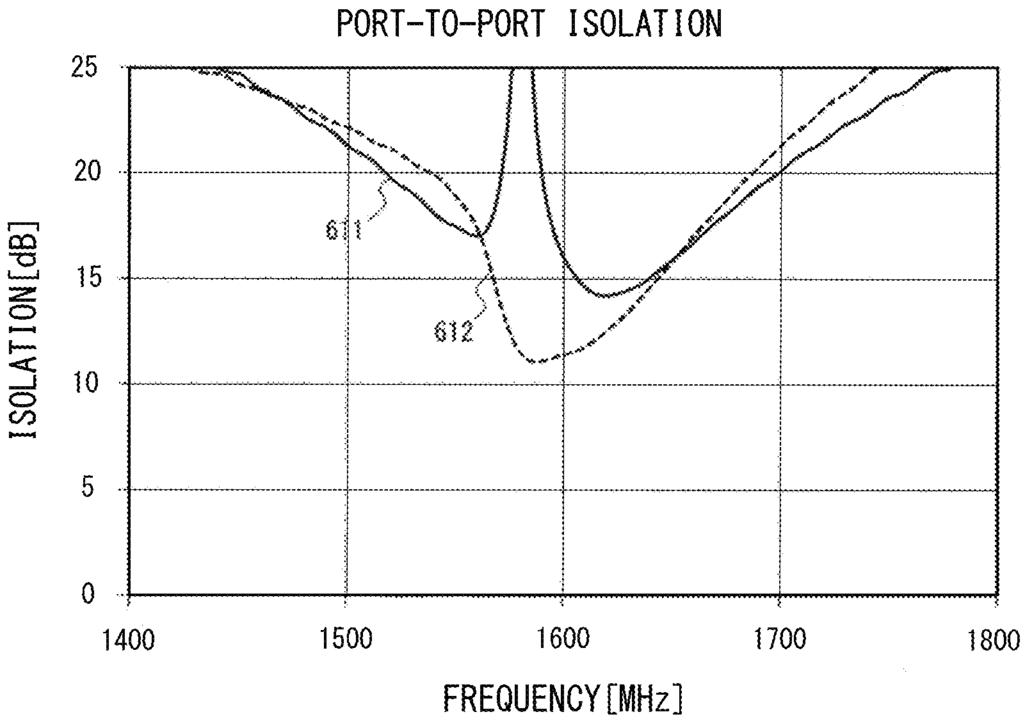
FIG. 9 is a port-to-port isolation characteristic diagram of the composite antenna device according to the modification example 1.

A horizontal-plane antenna gain characteristic diagram of the composite antenna device according to the modification example 1 is illustrated in FIG. 8. A port-to-port isolation characteristic diagram of the composite antenna device according to the modification example 1 is illustrated in FIG. 9. That is, a characteristic example of a horizontal-plane gain dBi of the composite antenna device according to the modification example 1 is illustrated in FIG. 8, and characteristic examples of port-to-port isolation dB, in other words, characteristic examples of isolation between the two cellular communication antennas and of isolation between the cellular communication antennas and the patch antenna 32 are illustrated in FIG. 9. The feeding point of the planar element 41 is denoted as "port 1", the feeding point of the planar element 42 is denoted as "port 2", and the feeding point of the patch antenna 32 is denoted as "port 3". Each horizontal axis represents a used frequency band MHz. In FIG. 8, a solid line 521 represents a horizontal-plane gain characteristic example observed in the port 1, and a broken line 522 represents a horizontal-plane gain characteristic example observed in the port 2. In FIG. 9, a solid line 611 represents a characteristic example of isolation between the port 1 and the port 3, and a broken line 612 represents a characteristic example of isolation between the port 2 and the port 3.

Referring to FIG. 8, in a case of the composite antenna device according to the modification example 1, the gain generally becomes high and stable at 2.4 GHz or higher.

Consequently, choices can be taken such as employing the configuration of the present embodiment in a case where antenna characteristics of the patch antenna 32 is considered to be more important than antenna characteristics in cellular communication and employing the configuration of the modification example 1 in the opposite case, and the degree of freedom in design can thereby be enhanced.

Comparative Example

Figure 10:
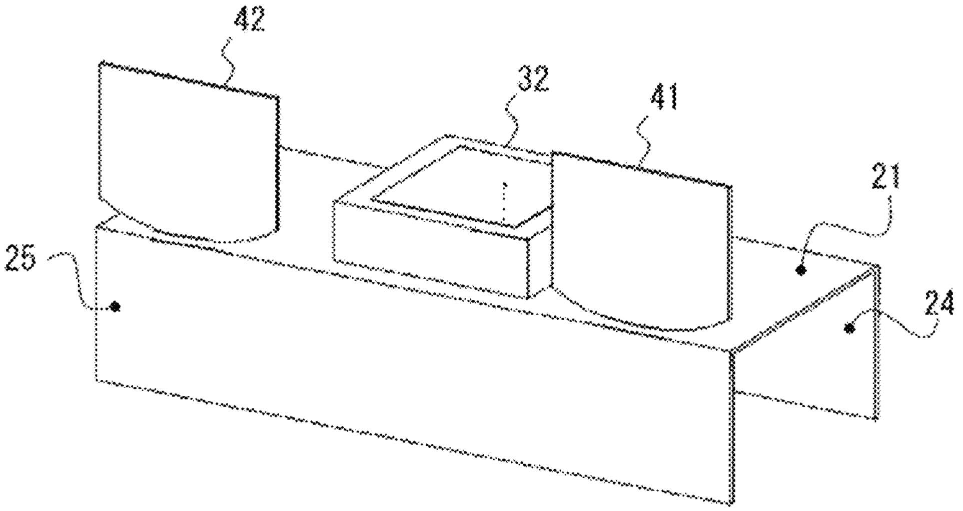
FIG. 10 is a schematic diagram of a composite antenna device according to a comparative example.
Figure 11:
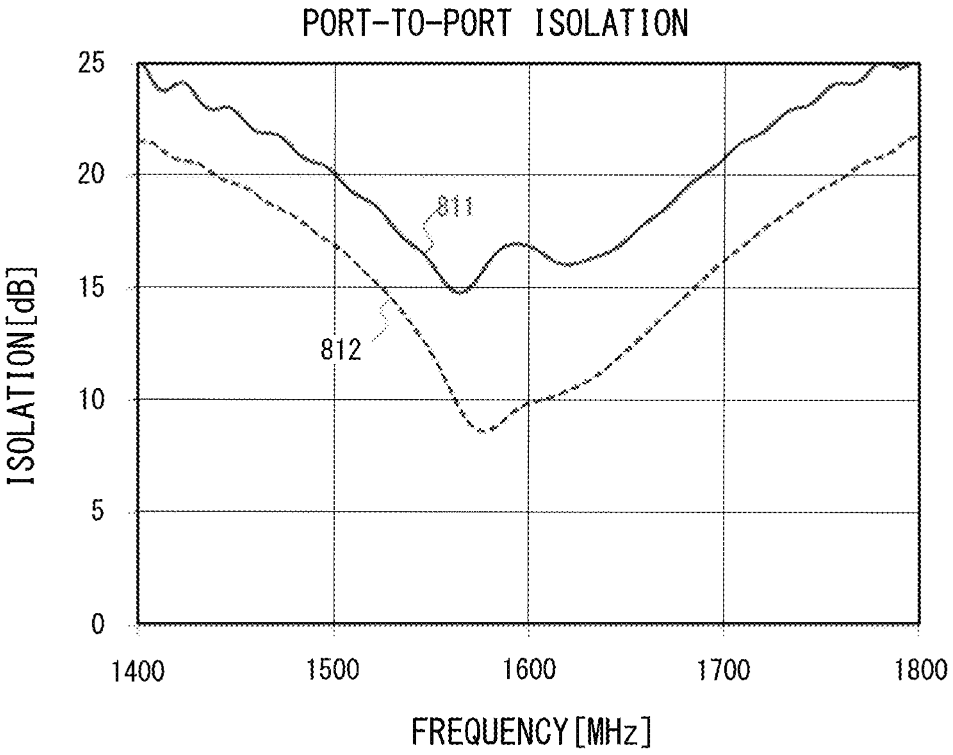
FIG. 11 is a port-to-port isolation characteristic diagram in a case of the comparative example.

A configuration in which the planar elements 41 and 42 do not extend downward from the flat surface portion 21 as in the modification example 1 but extend upward from the flat surface portion 21 as illustrated in FIG. 10 will be described as a comparative example. A port-to-port isolation characteristic diagram in a case of the comparative example illustrated in FIG. 10 is illustrated in FIG. 11. The characteristic diagram of FIG. 11 corresponds to the characteristic diagram of FIG. 9. That is, a solid line 811 represents a characteristic example of isolation between the port 1 and the port 3, and a broken line 812 represents a characteristic example of isolation between the port 2 and the port 3. In general, in either one of a case where used frequency bands are different and a case where extending directions of main coverages are different even when higher harmonics of the used frequency bands overlap or are adjacent, mutual interference between antennas can be inhibited. However, in a case where extending directions of main coverages overlap as in the comparative example, in this example, in a case where both of two antennas (second antennas) used as the cellular communication antennas are used together, inhibition of mutual interference between the antennas is not sufficient, and additional devising is needed.

When the characteristic diagrams of FIG. 9 and FIG. 11 are compared, depending on the used frequency band, the characteristic of the broken line 812 (the characteristic example of isolation between the port 2 and the port 3) in FIG. 11 which illustrates the case of the comparative example seems to be lower, throughout the whole frequency band, than the characteristic of the broken line 612 (the characteristic example of isolation between the port 2 and the port 3) in FIG. 9 which illustrates the case of the modification example 1. On the other hand, in the characteristic of the solid line 811 (the characteristic example of isolation between the port 1 and the port 3) in FIG. 11, almost similar values to the case of the modification example 1 are obtained except a portion of the frequency band. Consequently, it may be understood that the frequency band in which isolation between the port 1 and the port 3 is further improved can be made wider by using a configuration in which the planar elements 41 and 42 extend downward from the flat surface portion 21 as in the modification example 1 than using the configuration of the comparative example.

MODIFICATION EXAMPLE 2

Figure 12:
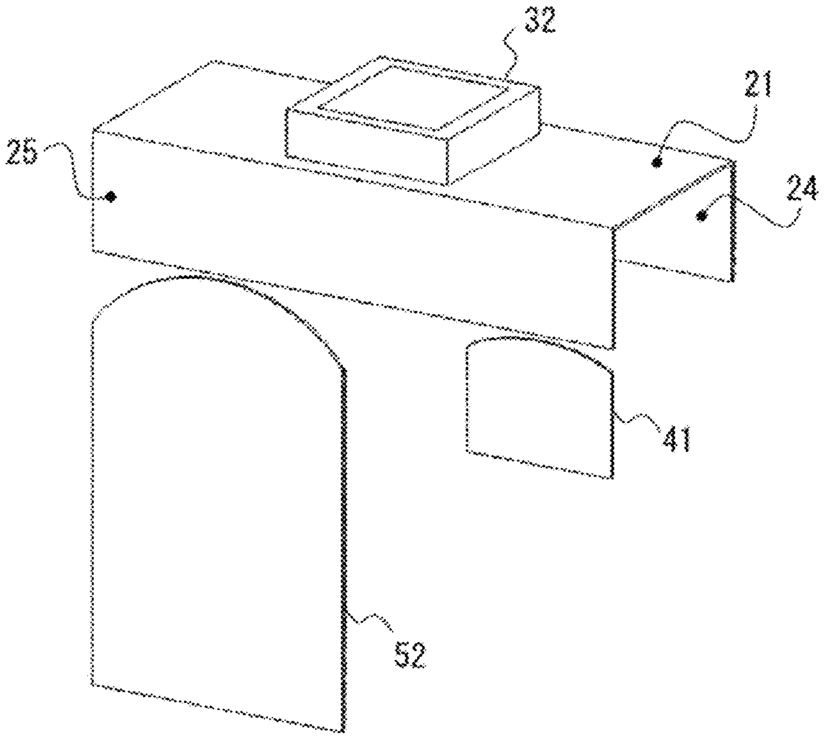
FIG. 12 is a schematic diagram of a composite antenna device according to a modification example 2.

In the present embodiment, a description is made on the assumption that the two planar elements 41 and 42 have the same size; however, as illustrated by a modification example 2 of FIG. 12, a configuration is possible in which either one, in the illustrated case, a planar element 52 is made larger than the planar element 41. In a composite antenna device according to the modification example 2 of FIG. 12, a configuration is illustrated in which the first side face portion 22 and the second side face portion 23 are removed; however, a configuration is possible which has at least one of the first side face portion 22 and the second side face portion 23.

Figure 13:
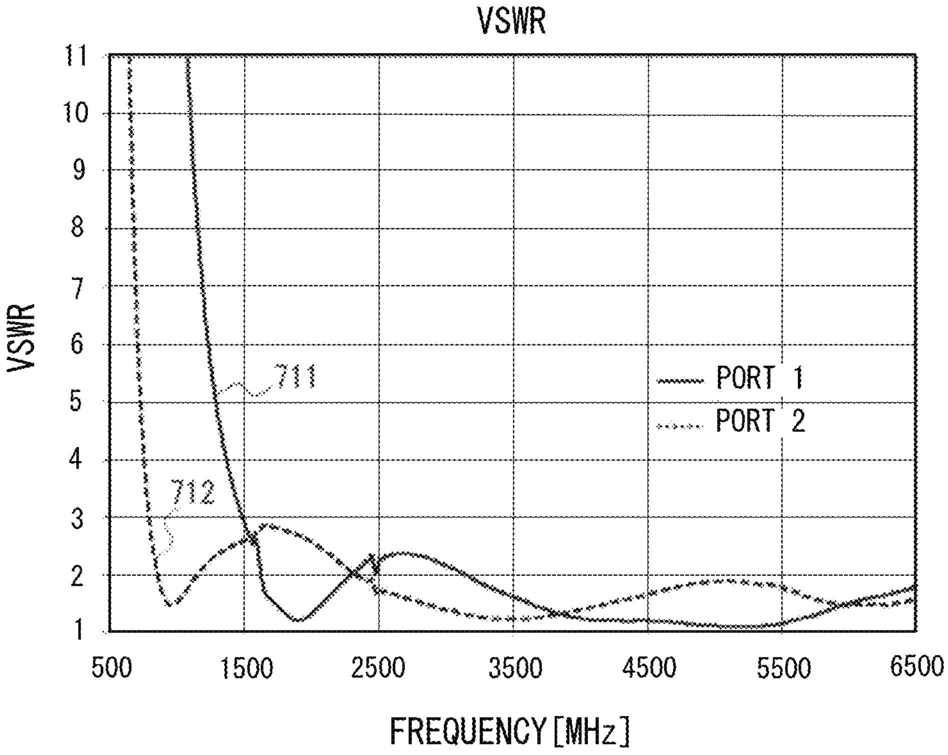
FIG. 13 is a VSWR characteristic diagram of the composite antenna device according to the modification example 2.

FIG. 13 is a VSWR characteristic diagram of a case of the modification example 2. The vertical axis represents a VSWR, and the horizontal axis represents a frequency MHz. Further, a solid line 711 represents a VSWR characteristic example observed in a port 1 (the feeding point of the planar element 41), and a broken line 712 represents a VSWR characteristic example observed in a port 2 (a feeding point of the planar element 52). In the illustrated example, the VSWR becomes 2 or lower around 1.6 GHz in a case of the planar element 41, but the VSWR becomes 2 or lower around 850 MHz in a case of the planar element 52. In other words, a configuration as in the modification example 2 is employed, and it thereby becomes possible to make a used frequency band a wider broadband.

MODIFICATION EXAMPLES 3 TO 8

Figure 14:
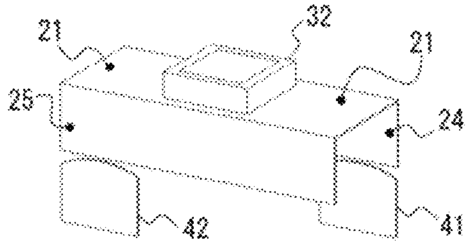
FIG. 14 illustrates schematic diagrams of composite antenna devices according to modification examples 3 to 7.
Figure 14:
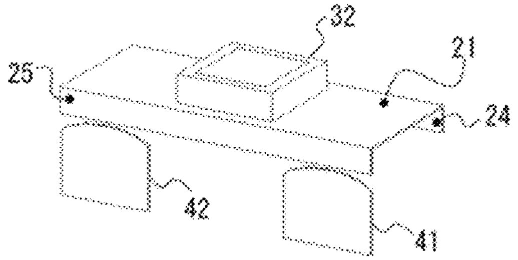
Figure 14:
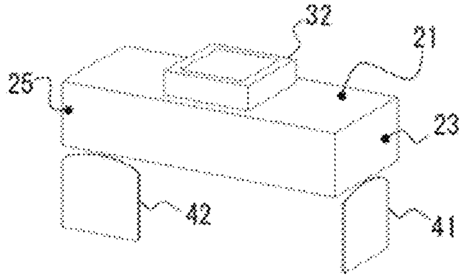
Figure 14:
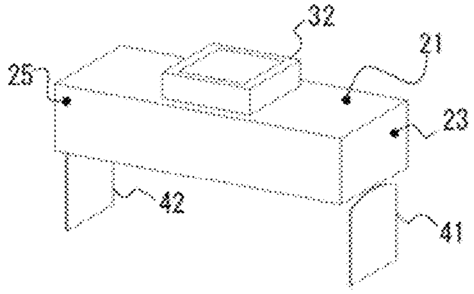
Figure 14:
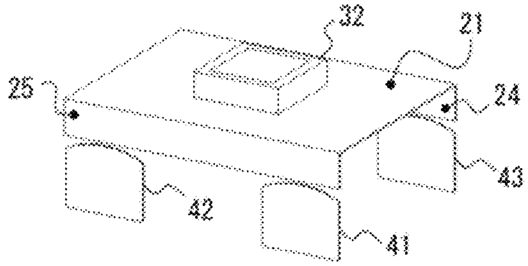
Figure 14:
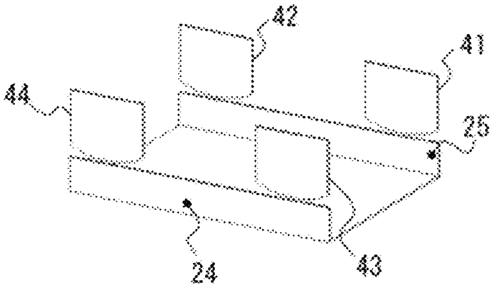

As for the shape of the three-dimensional ground plane 20 and arranging parts of the planar elements 41 and 42 of the composite antenna device, other than the above modification examples 1 and 2, as illustrated as examples in (A) to (F) of FIG. 14, further various combinations are possible.

A modification example 3 in (A) of FIG. 14 is a configuration in which the planar elements 41 and 42 are arranged to be diagonal to each other in a plane generally orthogonal to the flat surface portion 21 of the three-dimensional ground plane 20.

A modification example 4 in (B) of FIG. 14 is a configuration in which the heights of the third side face portion 24 and the fourth side face portion 25 are made shorter than other modification examples. In this case, the heights of the third side face portion 24 and the fourth side face portion 25 are desirably ⅙ or more of a wavelength $\lambda$ of the minimum frequency used in the planar elements 41 and 42. A configuration is possible in which the height of only either one of the third side face portion 24 and the fourth side face portion 25 is made shorter than other modification examples.

A modification example 5 in (C) of FIG. 14 is a configuration in which the planar element 41 and the planar element 42 are arranged to be perpendicular to each other. That is, the configuration of the modification example 5 is a configuration in which the planar element 41 is arranged to be in the same plane as the second side face portion 23 and the planar element 42 is arranged to be in the same plane as the fourth side face portion 25 which is arranged generally perpendicularly to the second side face portion 23. In such arrangement, isolation between the two planar elements 41 and 42 is more easily secured.

In a modification example 6 in (D) of FIG. 14, the two planar elements 41 and 42 (or vice versa) are respectively arranged in the same planes as the first side face portion 22 and the second side face portion 23 which are opposed to each other.

Modification examples 7 in (E) of FIG. 14 and in (F) of FIG. 14 in which arrangement is inverted in the Z-axis direction are configurations in which each of four planar elements 41, 42, 43, and 44 in the same configuration is arranged in a plane perpendicular or generally perpendicular to the flat surface portion 21 of the three-dimensional ground plane 20. The modification examples 7 are configurations in which the planar elements 41 and 42 are arranged to be in the same plane as the fourth side face portion 25 and the planar elements 43 and 44 are arranged to be in the same plane as the third side face portion 24 generally parallel with the fourth side face portion 25 and are configurations in which the planar elements 41 and 42 and the planar elements 43 and 44, which are arranged in the same planes, are arranged to be separated from each other.

An arrangement is possible in which the modification example 1 and the modification example 2 are appropriately combined. It is possible to arbitrarily change the numbers of planar elements 41 and 42. Further, in the modification examples 3 to 7 in (A) to (F) of FIG. 14, a configuration is possible in which the first side face portion 22 and the second side face portion 23 are removed, or a configuration is possible which has at least one of the first side face portion 22 and the second side face portion 23.

Figure 15:
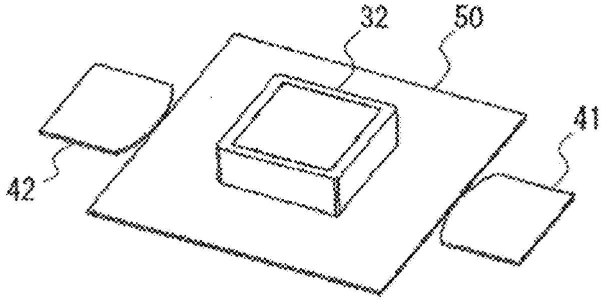
FIG. 15 is a schematic diagram of a composite antenna device according to a modification example 8.

In a modification example 8 of FIG. 15, a flat ground plane 50 is used as the first conductor portion instead of the three-dimensional ground plane 20. The flat ground plane 50 almost corresponds to a ground plane in which the inclined face portions (the first side face portion 22, the second side face portion 23, the third side face portion 24, and the fourth side face portion 25) are positioned in the same plane as the flat surface portion 21 in the three-dimensional ground plane 20. The patch antenna 32 as the first antenna is placed on the flat ground plane 50. The two planar elements 41 and 42 as the second antennas are arranged in the same plane as the flat surface portion 21 across the flat ground plane 50. The flat ground plane 50 acts as a ground plane of the patch antenna 32.

An arrangement interval between the two planar elements 41 and 42 is approximately $13/60$ or more of a wavelength $\lambda$ (=above-described approximately $\lambda/6$+ approximately ($2/5$) $\lambda$) of the usable minimum frequency, and respective arrangement intervals between the planar element 41 and the patch antenna 32 and between the planar element 42 and the patch antenna 32 are above-described approximately $\lambda/6$ or more. Thus, mutual interference is unlikely to occur even when extending directions of main coverages are the same.

OTHER MODIFICATION EXAMPLES

In the present embodiment, a description is made about an example of a case where the planar element 41 is realized by forming the antenna patterns 411 and 412 are formed on both surfaces of one printed substrate 410; however, the antenna patterns 411 and 412 may directly be made by using sheet metal or a metal mold.

Further, the antenna patterns 411 and 412 are not necessarily planar but may have linear shapes, net shapes, fractal shapes, and other shapes, which are shapes providing performance equivalent to planes in accordance with the used frequency. The same applies to a case of the planar element 42.

Further, a configuration is possible in which the antenna pattern 411 or the antenna pattern 412 is mounted on only one surface of one printed substrate 410.

In the present embodiment, a description is made on the assumption that the cellular communication antenna as the second antenna operates in a frequency band of 1.7 GHz or higher to 6 GHz or lower; however, the size of at least one planar element is made larger, and a cellular communication antenna which operates on a lower range side may thereby be configured.

Further, in the present embodiment, a description is made about an example where the flat surface portion 21 of the three-dimensional ground plane 20 or the flat ground plane 50 has a quadrangular shape; however, the shape of each of the ground planes 20 and 50 may of course be a square, a rectangle, a general square, or a general rectangle and may be a symmetrical shape such as a circle, an ellipse, a general circle, or a general ellipse. In short, it is sufficient that an electrically conductive element (for example, the planar element 41) providing planar antenna characteristics or those equivalent to planar antenna characteristics is formed as a second conductor portion in the same plane as a plane formed perpendicularly, generally perpendicularly, or horizontally to a flat surface portion in each shape. Further, in a case where the flat surface portion 21 is in a circular shape, the second conductor portion may be configured to have the curvature corresponding to the shape of the flat surface portion.

Further, in the present embodiment, a description is made on the assumption that the four side face portions 22 to 25 of the three-dimensional ground plane 20 are integrated together; however, a gap (slit) may be formed between at least a pair of side face portions neighboring each other or between each of the side face portions 22 to 25 and the side face portion neighboring that. This gap acts to inhibit a leakage current which flows through the side face portions 22 to 25 while securing an area in which those act as the ground plane.

In the present embodiment, a description is made about a configuration in which the two planar elements 41 and 42 are mounted on the three-dimensional ground plane 20 or the flat ground plane 50; however, a configuration is possible which includes only one planar element.

Further, in the present embodiment, a description is made about an example of a case where the three-dimensional ground plane 20 or the flat ground plane 50 acts as the ground-side element of the two planar elements 41 and 42; however, the three-dimensional ground plane 20 or the flat ground plane 50 may be caused to act as a ground plane of the two planar elements 41 and 42. In this case, the two planar elements 41 and 42 are designed to have such sizes that the planar elements 41 and 42 themselves become antennas usable in predetermined frequency bands.

Further, in the present embodiment, a description is made about a configuration in which the planar elements 41 and 42 are mounted in the same plane as any of the plural side face portions which incline at predetermined angles with respect to the flat surface portion 21 of the three-dimensional ground plane 20; however, a configuration is possible in which the planar elements 41 and 42 are mounted to incline at predetermined angles with respect to any of the side face portions.

Further, in the present embodiment, a description is made about a case where the flat surface portion 101 of the radome 10 has a quadrangular shape; however, this flat surface portion 101 may be changed appropriately in accordance with the shape of the three-dimensional ground plane 20. Further, the shape of the opening window portion 26 can be changed appropriately in accordance with the shape of the patch antenna 32. For example, in a case of a circular patch antenna, the shape of the opening window portion may be made a circular shape.

Further, in the embodiment, a configuration is provided in which the patch antenna 32 is arranged in parallel or generally parallel with the earth; however, a configuration is possible in which the patch antenna 32 is arranged to be perpendicular or generally perpendicular to the earth. In this case, the cellular communication antennas as the second antennas are positioned on an opposite side to the side where the patch antenna 32 is arranged with respect to the ground.

The present specification provides the following aspects.

(Aspect 1-1)

This aspect provides a composite antenna device including: a first antenna; plural second antennas whose used frequency bands are different from a used frequency band of the first antenna; and a first conductor portion to serve as a ground plane of the first antenna and the second antennas, in which each of the plural second antennas has a second conductor portion, the first antenna is provided on the first conductor portion, and at least a portion of the first conductor portion is positioned between the second conductor portions.

In the aspect 1-1, since the first conductor portion is used as the ground plane of both of the first antenna and the second antennas, an antenna size can be made small compared to a case where a ground plane of each antenna is separately provided. Since at least one pair of second conductor portions are arranged with the first conductor portion interposed between each other, interference between the first antenna and the plural second antennas and interference between the plural second antennas are inhibited. Accordingly, it becomes possible to improve characteristics of each antenna while inhibiting an increase in antenna size.

(Aspect 1-2)

This aspect provides the composite antenna device according to the aspect 1-1, in which extending directions of main coverages of the plural second antennas are different from an extending direction of a main coverage of the first antenna.

In the aspect 1-2, interference between the first antenna and the plural second antennas is inhibited, and it becomes possible to improve characteristics of each antenna.

(Aspect 1-3)

This aspect provides the composite antenna device according to the aspect 1-1 or the aspect 1-2, in which the first conductor portion has a flat surface portion on which the first antenna is placed and the plural second conductor portions are arranged in the same plane as the flat surface portion with the flat surface portion.

In the aspect 1-3, even when the extending directions of the main coverages of the second antennas are the same, the distance between the second antennas can be increased, and mutual interference is thus unlikely to occur.

(Aspect 1-4)

This aspect provides the composite antenna device according to the aspect 1-1 or the aspect 1-2, in which the first conductor portion has a flat surface portion on which the first antenna is placed and the plural second conductor portions are arranged on a different side from a side where the first antenna is placed with respect to the flat surface portion.

In the aspect 1-4, interference between the first antenna and the plural second antennas and interference between the plural second antennas are inhibited, and it becomes possible to improve characteristics of each antenna.

(Aspect 1-5)

This aspect provides the composite antenna device according to the aspect 1-4, in which the first conductor portion further has an inclined face portion which inclines at a predetermined angle with respect to the flat surface portion and the plural second conductor portions are electrically continuous with the inclined face portion.

In the aspect 1-5, since the distance between the first antenna and the second antennas can further be increased, interference between the first antenna and the plural second antennas and interference between the plural second antennas are inhibited, and it becomes possible to improve characteristics of each antenna.

(Aspect 1-6)

This aspect provides the composite antenna device according to any of the aspect 1-1 to the aspect 1-5, in which positions of feeding points of the second antennas are different from a position of a feeding point of the first antenna.

In the aspect 1-6, since isolation between the feeding points of the first antenna and the second antennas can be further improved, interference between the first antenna and the plural second antennas and interference between the plural second antennas are inhibited, and it becomes possible to improve characteristics of each antenna.

(Aspect 1-7)

This aspect provides the composite antenna device according to any of the aspect 1-1 to the aspect 1-6, in which feeding points of the plural second conductor portions are separated by ¼ or more of a wavelength of an electric wave in the used frequency bands of the second antennas.

In the aspect 1-7, since isolation between the feeding points of the plural second antennas can be further improved, interference between the plural second antennas is inhibited. Further, even when the extending directions of the main coverages are the same, interference between the plural second antennas is inhibited, and it becomes possible to improve characteristics of each antenna.

(Aspect 1-8)

This aspect provides the composite antenna device according to any of the aspect 1-2 to the aspect 1-7, in which the first conductor portion has plural inclined face portions which incline at predetermined angles with respect to the flat surface portion and the plural second conductor portions are arranged on at least one of the plural inclined face portions.

In the aspect 1-8, a space can be used effectively while plural antennas are provided.

(Aspect 1-9)

This aspect provides the composite antenna device according to any of the aspect 1-2 to the aspect 1-7, in which the first conductor portion has plural inclined face portions which incline at predetermined angles with respect to the flat surface portion and at least one of the plural second conductor portions is arranged on a different inclined face portion from an inclined face portion on which another second conductor portion is arranged.

In the aspect 1-9, even when the extending directions of the main coverages are the same, because isolation from each other can be secured, interference between the plural second antennas is inhibited, and it becomes possible to improve characteristics of each antenna.

(Aspect 1-10)

This aspect provides the composite antenna device according to any of the aspect 1-1 to the aspect 1-9, in which at least one of the plural second conductor portions has an insulating substrate, a first electric conductor formed on a surface of the substrate, a second electric conductor formed on a back surface of the substrate, and an electrically conductive viahole which causes the first electric conductor and the second electric conductor to be electrically continuous with each other.

In the aspect 1-10, action like a biconical antenna is performed, and it becomes possible to achieve a broadband.

(Aspect 1-11)

This aspect provides the composite antenna device according to the aspect 1-10, in which the first electric conductor and the second electric conductor have linear shapes or planar shapes.

In the aspect 1-11, action like a biconical antenna is performed, and it becomes possible to achieve a broadband.

(Aspect 1-12)

This aspect provides the composite antenna device according to any of the aspect 1-1 to the aspect 1-11, further including a coaxial cable, in which a center-side conductor of the coaxial cable is electrically continuous with the second conductor portions and an outside conductor of the coaxial cable is electrically continuous with the first conductor portion.

In the aspect 1-12, the first conductor portion acts as a ground of the first antenna and the plural second antennas, and the second conductor portions act as antennas.

(Aspect 1-13)

This aspect provides the composite antenna device according to any of the aspect 1-1 to the aspect 1-12, in which the first antenna and the second antennas use an electric wave in a frequency band of 1 GHz or higher.

In the aspect 1-13, since the first conductor portion acts as a sufficiently large ground plane, a measure against a leakage current such as a ferrite core does not have to be applied. Further, since a measure against a leakage current such as a ferrite core is not necessary, a whole antenna device configuration can be made small and simple.

(Aspect 1-14)

This aspect provides the composite antenna device according to any of the aspect 1-1 to the aspect 1-13, in which the first antenna is a patch antenna and the second antennas are cellular communication antennas.

In the aspect 1-14, since the used frequency bands of the first antenna and the second antennas are high frequency bands, the first conductor portion acts as a sufficiently large ground plane, and a measure against a leakage current such as a ferrite core does not have to be applied. Further, since a measure against a leakage current such as a ferrite core is not necessary, a whole antenna device configuration can be made small and simple.

(Aspect 2-1)

This aspect provides a composite antenna device including: a first antenna; a second antenna of which a used frequency band and an extending direction of a main coverage are different from a used frequency band and an extending direction of a main coverage of the first antenna; a first conductor portion to serve as a ground plane of the first antenna and the second antenna; and a second conductor portion to serve as the second antenna, in which the first conductor portion has a flat surface portion on which the first antenna is placed and an inclined face portion which inclines at a predetermined angle on an opposite side to a side where the first antenna is placed with respect to the flat surface portion, the second conductor portion is electrically continuous with the inclined face portion, and the second conductor portion has an insulating substrate and an electric conductor formed on a surface of the substrate.

In the aspect 2-1, since the first conductor portion is used as the ground plane of both of the first antenna and the second antenna, an antenna size can be made small compared to a case where a ground plane of each antenna is separately provided. Further, since isolation between the first antenna and the second antenna can be secured and the extending directions of the main coverages of the first antenna and the second antenna are different, interference between the first antenna and the second antenna is inhibited. Accordingly, it becomes possible to improve characteristics of each antenna while inhibiting an increase in antenna size.

(Aspect 3-1)

This aspect provides a composite antenna device including: a first antenna; a second antenna whose extending direction of a main coverage is different from an extending direction of a main coverage of the first antenna; a first conductor portion to serve as a ground plane of the first antenna and the second antenna; and a second conductor portion to serve as the second antenna, in which the first conductor portion has a flat surface portion on which the first antenna is placed, the second antenna is arranged on an opposite side to a side, with the flat surface portion in between, where the first antenna is placed, the first antenna is a patch antenna, and the second antenna is a cellular communication antenna.

In the aspect 3-1, since the first conductor portion is used as the ground plane of both of the first antenna and the second antenna, an antenna size can be made small compared to a case where a ground plane of each antenna is separately provided. Further, the used frequency bands of the first antenna and the second antenna are different from each other, sufficient isolation between the first antenna and the second antenna can be secured, and the extending directions of the main coverages of the first antenna and the second antenna are different. Thus, interference between the first antenna and the second antenna is inhibited. Accordingly, it becomes possible to improve characteristics of each antenna while inhibiting an increase in antenna size. Further, since the used frequency bands of the first antenna and the second antenna are high frequency bands, the first conductor portion acts as a sufficiently large ground plane, and a measure against a leakage current such as a ferrite core does not have to be applied. Further, since a measure against a leakage current such as a ferrite core is not necessary, a whole antenna device configuration can be made small and simple.

(Aspect 3-2)

This aspect provides the composite antenna device according to the aspect 3-1, in which the first conductor portion further has an inclined face portion which is connected with the flat surface portion at one end and which extends on an opposite side to the side where the first antenna is placed with respect to the flat surface portion while inclining at a predetermined angle, the second conductor portion is electrically continuous with another end of the inclined face portion, and a position of a feeding point of the second antenna is different from a position of a feeding point of the first antenna.

In the aspect 3-2, since isolation between the feeding points of the first antenna and the second antenna can be further improved, interference between the first antenna and the second antenna is inhibited.

(Aspect 3-3)

This aspect provides the composite antenna device according to the aspect 3-2, in which a separation distance between the feeding point of the first antenna and the feeding point of the second antenna is approximately ⅙ or more of a wavelength of a minimum frequency of the second antenna.

In the aspect 3-3, since isolation between the feeding points of the first antenna and the second antenna can be further improved, interference between the first antenna and the second antenna is inhibited.

The invention claimed is:

1. A composite antenna device comprising:

a first antenna;

plural second antennas that use frequency bands that are different from a frequency band used by the first antenna; and a first conductor configured as a ground plane of the first antenna and the plural second antennas, wherein each of the plural second antennas has a corresponding second conductor thus forming plural second conductors that are separated from each other;

wherein the first antenna is provided on the first conductor;

wherein the first conductor is provided on a base and housing in a radome;

wherein the first conductor has a flat surface on which the first antenna is placed and an inclined face which inclines at a predetermined angle with respect to the flat surface;

wherein the plural second conductors are arranged on a different side from a side where the first antenna is placed with respect to the flat surface; and wherein the plural second conductors are electrically continuous with the inclined face.

2. The composite antenna device according to claim 1, wherein extending directions of main coverages of the plural second antennas are different from an extending direction of a main coverage of the first antenna.

3. The composite antenna device according to claim 2, wherein:

the inclined face of the first conductor which inclines at the predetermined angle is one of plural inclined faces which incline at corresponding predetermined angles with respect to the flat surface; and at least one of the plural second conductors is arranged on a first inclined face of the plural inclined faces and another of the plural second conductors is arranged on a second inclined face of the plural inclined faces different from the first inclined face.

4. The composite antenna device according to claim 1, wherein:

the plural second conductors are arranged in a same plane as the flat surface with the flat surface in between.

5. The composite antenna device according to claim 1, wherein positions of feeding points of the plural second antennas are different from a position of a feeding point of the first antenna.

6. The composite antenna device according to claim 1, wherein feeding points of the plural second conductors are separated by ¼ or more of a wavelength of an electric wave in the frequency bands used by the plural second antennas.

7. The composite antenna device according to claim 1, wherein:

the inclined face of the first conductor is one of plural inclined faces; and the plural second conductors are arranged on at least one of the plural inclined faces of the first conductor.

8. The composite antenna device according to claim 1, wherein at least one of the plural second conductors has:

an insulating substrate, a first electric conductor formed on a surface of the substrate, a second electric conductor formed on a back surface of the substrate, and an electrically conductive viahole which causes the first electric conductor and the second electric conductor to be electrically continuous with each other.

9. The composite antenna device according to claim 8, wherein the first electric conductor and the second electric conductor have linear shapes or planar shapes.

10. The composite antenna device according to claim 1, further comprising a coaxial cable, wherein a center-side conductor of the coaxial cable is electrically continuous with the second conductors, and wherein an outside conductor of the coaxial cable is electrically continuous with the first conductor.

11. The composite antenna device according to claim 1, wherein the first antenna and the plural second antennas use an electric wave in the respective frequency bands, wherein the respective frequency bands of the first antenna and the plural second antennas are 1 GHz or higher.

12. The composite antenna device according to claim 1, wherein:

the first antenna is a patch antenna; and the plural second antennas are cellular communication antennas.

13. A composite antenna device comprising:

a first antenna;

plural second antennas that use frequency bands that are different from a frequency band used by the first antenna; and a first conductor configured as a ground plane of the first antenna and the plural second antennas, wherein each of the plural second antennas has a corresponding second conductor thus forming plural second conductors that are separated from each other;

wherein the first antenna is provided on the first conductor; and wherein the first conductor is provided on a base and housing in a radome;

wherein at least one of the plural second conductors has:

an insulating substrate, a first electric conductor formed on a front surface of the substrate, a second electric conductor formed on a back surface of the substrate, and an electrically conductive viahole which causes the first electric conductor and the second electric conductor to be electrically continuous with each other.

14. A composite antenna device comprising:

a first antenna;

plural second antennas that use frequency bands that are different from a frequency band used by the first antenna; and a first conductor configured as a ground plane of the first antenna and the plural second antennas, wherein each of the plural second antennas has a corresponding second conductor thus forming plural second conductors that are separated from each other;

wherein the first antenna is provided on the first conductor;

wherein the first conductor is provided on a base and housing in a radome;

wherein the first conductor has a flat surface on which the first antenna is placed and an inclined face which inclines at a predetermined angle with respect to the flat surface;

wherein the inclined face of the first conductor is one of plural inclined faces; and wherein the plural second conductors are arranged on at least one of the plural inclined faces of the first conductor.

* * * * *